Feb. 24, 1959   E. J. NOSSEN   2,874,906
CONTROL APPARATUS WITH PROCESS ANALOG
Filed March 24, 1955
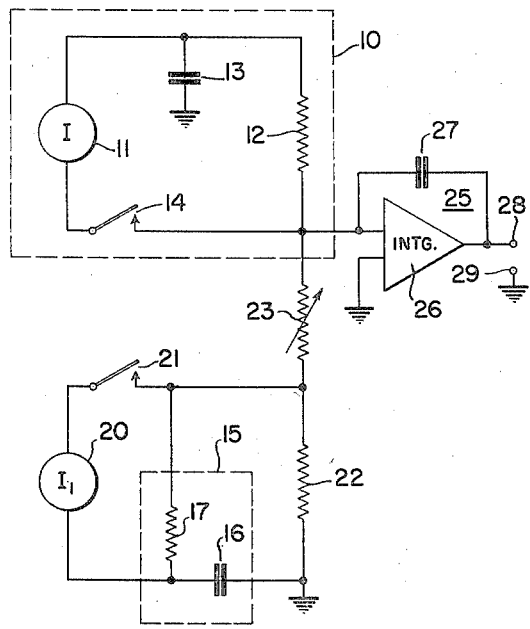
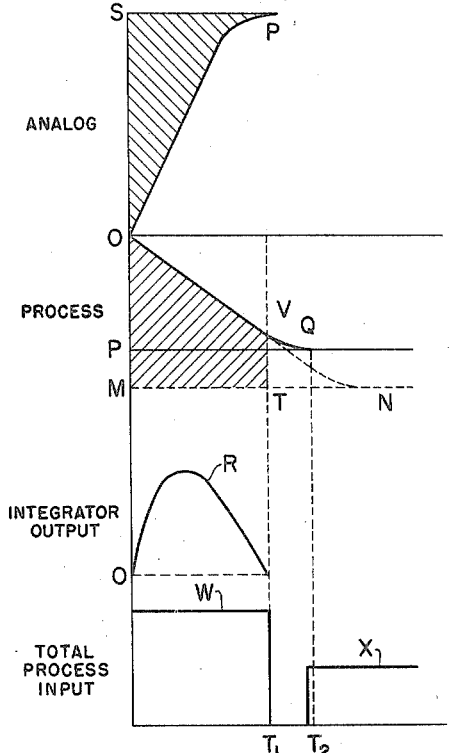
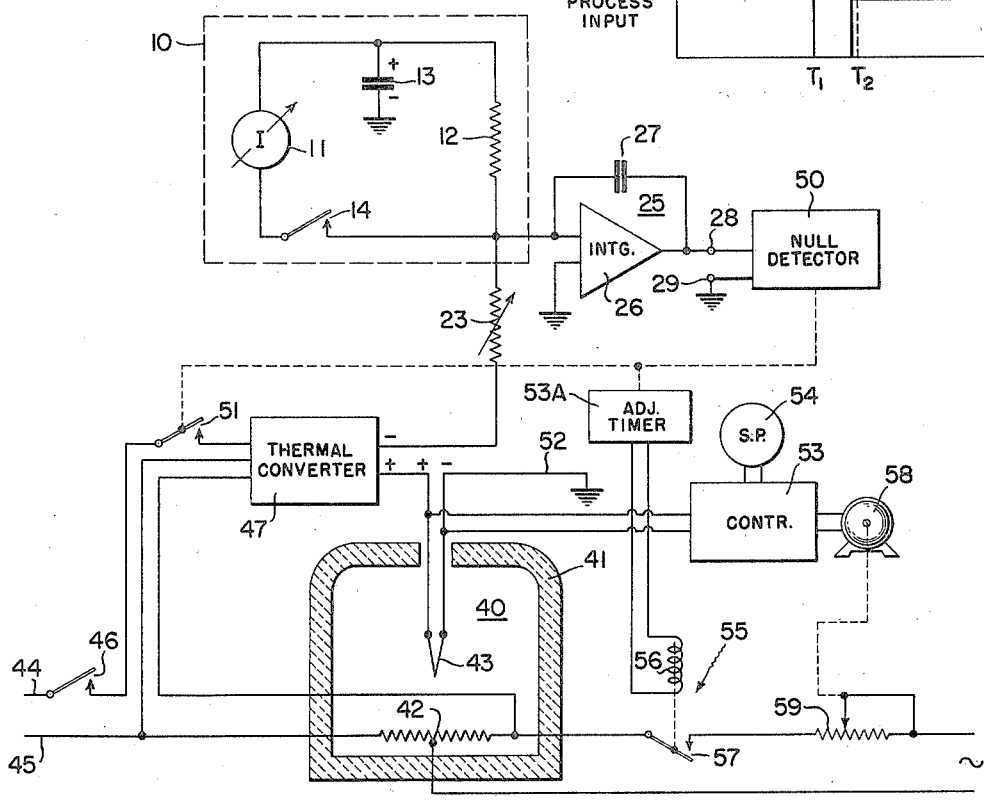

United States Patent Office 2,874,906
Patented Feb. 24, 1959

2,874,906
CONTROL APPARATUS WITH PROCESS ANALOG

Edward J. Nossen, Pennsauken, N. J., assignor to Minneapolis-Honeywell Regulator Company, Minneapolis, Minn., a corporation of Delaware Application March 24, 1955, Serial No. 496,401

11 Claims. (Cl. 236—15)

A general object of the present invention is to provide a new and improved process controller. More specifically, the present invention is concerned with a process controller useful in changing the magnitude of a process variable from one value to another in a minimum of time without any overshooting or instability of the process during or immediately after the change.

The automatic control of process variables frequently involves changing the magnitude of the controlled process variable from one value to another. The most widely encountered process variable change is that occurring during a process start-up at which time the process variable is changed from some start-up value to a desired set point value. In a furnace, for example, on start-up, the furnace temperature will change from an ambient temperature to a desired set point temperature. The quickest way to change a process variable from one value to another is to apply a maximum control operation to the process. In the case of a furnace on start-up, this will mean that maximum heat input should be applied to the furnace. However, if a maximum input is applied to the process until the process variable actually reaches the set point value, the process will normally have sufficient inertia or dead time stored in it that it will result in the process variable overshooting the desired set point value. There is thus danger that the process will be damaged and there may be an accompanying loss of quality in the product of the process. The process input must therefore be shut down from maximum input to minimum input at a time which will permit the process variable to coast to the desired set point value without any overshooting or instability.

The objects of the present invention are achieved by the use of a predicting analog which has supplied thereto a preselected input signal which is a function of the set point signal to which the process variable is to be set. The output of the analog may be used to determine the useful input required to change the analog output from one value to another. This output, when integrated, will give a quantitative signal indicative of the total useful input to the process analog. A further signal is applied to the input of the integrating means and this signal is indicative of the useful input going into the process being controlled. The useful input is here used to designate that amount of the input which is required to actually change the process variable from one value to another.

When a predetermined equality has been established between the analog signal and the process signal, a process controller may be actuated to interrupt the process input. When the process input is cut off, the process will coast to the desired set point at which time a conventional controller will take over and control the process in a conventional manner.

It is therefore a more specific object of the present invention to provide a new and improved process controller using a predicting analog to regulate the changing of a process variable from one magnitude to another.

Another object of the present invention is to provide an improved predicting controller using an analog of the process feeding a signal to an integrating means to determine the useful input required in the process to change the magnitude of the process variable from one value to another.

A still further object of the present invention is to provide a predicting controller using an analog of the process where the input to the analog used in changing the analog variable from a first value to a second value is compared with the useful input to a process used in changing the process variable from a first value to a second value.

The various features of novelty which characterize the invention are pointed out with particularity in the claims annexed hereto and forming a part of this specification. For a better understanding of the invention, its advantages, and specific objects obtained with its use, reference should be had to the accompanying drawings and descriptive matter in which there is illustrated and described preferred embodiments of the invention.

Of the drawings:

Fig. 1 is a schematic circuit of a process and a predicting analog where both the process and the analog comprise resistance and capacity elements;

Fig. 2 shows the principles of the present invention applied to the regulation of the start-up of an electric furnace; and Fig. 3 shows a graphical presentation of the operation of the apparatus of Figs. 1 and 2.

Referring first to Fig. 1, the numeral 10 represents a process analog and its signal generator shown in its simplest form to facilitate an understanding of the invention. The generator is a current generator 11 and is connected to supply a signal to a resistance unit 12 and a capacity unit 13. A switch 14 is used to control the application of the signal from the generator 11 to the resistance and capacity units 12 and 13. This is known as a first order process analog. Analogs of higher order may well be substituted for the analog shown. The damping factor is preferably of the same character as the process to be controlled.

A simulated process 15 comprises a capacitor 16 and a resistor 17. A process input 20 is arranged for connection to the simulated process 15 by way of a control switch 21. Connected to the output of the simulated process 15 is a resistor 22 and a further adjustable resistor 23, the latter of which may be identified as a time scale factor adjusting means.

The signals from the simulated process 15 and the analog 10 are arranged for application to an operational integrator 25 which comprises an amplifier section 26 and an integrating capacitor 27. The output of the integrator will appear on terminals 28 and 29. While an electronic integrator is suitable for relatively short time constant processes, other types of integrators may be more suitable for long time constant processes.

In considering the operation of Fig. 1, the functioning of the analog 10 will first be considered. Upon the closing of the switch 14, the current generator 11 will be connected in a closed series circuit with the resistor 12. In addition, a current signal will be supplied to the capacitor 13 and this current signal path may be traced from the lower terminal of the generator 11 through switch 14, capacitor 27, output terminal 28 and grounded terminal 29 (the latter of which have low impedance therebetween) to the ground on capacitor 13 back through the capacitor 13 to the upper terminal of the generator 11. The capacitor 13 will thus become charged. Insofar as the integrator 25 is concerned, it has its input effectively grounded so that signalwise, the resistor 12 is in parallel with the capacitor 13. Thus, the integrator time constants are independent of the analog time constants.

The current signal used to charge the capacitor 13 will be integrated by the operational integrator 25 with the final signal on the output of the integrator being indicative of the useful current required to change the analog variable, represented by the voltage on the capacitor 13, from its initial value to a final saturated value determined by the input signal from the generator 11. The output of the generator 11 will determine the set point of the process as represented by the S—P line in Fig. 3, which is equivalent to the process line P—Q. The integrator output may be considered to be the area of the curve OSPO shown in Fig. 3.

Next to be considered is the signal produced on the output of the simulated process 15. Upon the closing of the switch 21, the simulated process input 20 is connected directly to the resistor 17. In addition, the input 20 is connected to supply a current signal to the capacitor 16. The circuit for supply of a current signal to the capacitor 16 may be traced from the upper terminal of the input 20 through switch 21, resistor 22, through capacitor 16, to the lower terminal of the input 20. In addition, a further circuit may be traced from the input 20 through switch 21, resistor 23, integrating capacitor 27, output terminals 28, grounded terminal 29, ground, capacitor 16, back to the lower terminal of the input 20. The amount of current flowing through the last traced circuit, which includes the integrating capacitor 27, may be controlled by the adjustment of the time scale factor resistor 23.

Neglecting the signal from the analog 10, the signal from the process will be integrated by the integrator 25 to produce a quantitative signal indicative of the total useful input to the simulated process 15 as represented by the current used in charging the condenser 16. This may be represented by the area enclosed in Fig. 3 by the lines O—M—N—O. The line M—N is representative of the saturated input to the process. The curves of the process are shown in Fig. 3 on a time scale comparable to that of the analog. In a practical embodiment, it is desired that the analog make its computation prior to the time necessary to effect a change in the process. The last described area O—M—N—O from Fig. 3 is actually representative of the total amount of useful input that would be required in changing the process variable from a zero value to a maximum value determined by applying the maximum input to the process. As the process is not intended to be operated continuously with maximum input, this latter is useful only in indicating that the integrator 25 would produce a signal indicative of such a quantitative input should the process be operated from start-up until the maximum value is reached. In the operation to be considered below, the line P—Q is assumed to be the desired set point value of the process variable.

It will be recalled that one of the objects of the invention is to use a predicting analog by which it is possible to control the start-up of the process. To consider the apparatus in its complete role as a start-up controller, it is first assumed that both of the switches 14 and 21 are closed at the same time. The signal applied in the analog 10 will produce a predetermined current flow through the capacitor 27 from right to left. As the process analog 10 is selected to have a fast time constant, the analog 10 will have its useful input determined by the integrator 25 in a relatively short time. As viewed in Fig. 3, the integrator output, as represented by the curve R, will initially rise relatively quickly in a positive direction. As the signal from the simulated process 15 will be flowing through the integrating capacitor 27 in a direction opposite to that of the analog signal, the process signal will tend to cause the integrator output to go in the opposite direction. After the analog 10 has saturated, the integrator output will be due solely to the process output and the slope of the curve R will go in the opposite direction toward a zero output, and in the absence of other circuitry would go beyond zero. As soon as the area of the analog curve O—S—P—O equals the area from the process O—M—T—V—O, the output of the integrator will have reached zero again. This will indicate that the useful input supplied to the simulated process 15 will correspond to the useful input determined as necessary by the analog 10 so that the process input may be shut off.

In the case of a first order process with no dead time, the input to the process may be maintained until the process variable actually reaches the set point value. However, in the case of a first order process with dead time or a higher order process having inertia, the process input must be cut off at a time prior to the actual reaching of the set point by the process variable. This is what in effect has been represented by the curves shown in Fig. 3.

In the case of a process having a dead time or an order higher than one, the total process input would be supplied as indicated in Fig. 3 by the curve W. The process input would be cut off at time $T_1$ and would remain off until such time as the process coasted to the desired set point line. As soon as the process reaches the desired set point line, a conventional controller may be used to switch in the correct amount of input to maintain the process variable at its desired set point. This input may be as represented by the input X, shown in Fig. 3.

The circuit of Fig. 2 represents the application of the principles discussed in connection with Fig. 1 to an electrical furnace whose output variable or process variable is temperature. In this figure, components corresponding to the components of Fig. 1 carry corresponding reference characters. Added to Fig. 2 is the process 40 represented by the furnace 41 having a heater 42 positioned therein with a thermocouple 43 measuring the temperature or process variable. The input to the process is from a pair of power lines 44 and 45 by way of a switch 46. The input flows through a thermal converter 47 of conventional type, having an output of the same order of magnitude as the thermocouple 43, and thence to the input heater 42 within the furnace 41.

The purpose of the thermal converter 47 is to provide a signal which is representative of the power input to the process or furnace 40. To this end, the input of the converter 47 is connected in the energizing circuit to the furnace heater 42 in the conventional manner, by the conductors at the left of the converter 47 in Fig. 2, to respond to the current and voltage of the electrical input supplied to the furnace heater 42. Specifically, the power line 44 is shown as being connected through the input connections or terminals of the converter 47 in its path to the heater 42. This provides the usual current connection for the converter 47. Also, the illustrated connection between the converter input terminals and the power line 45 provides, in conjunction with the foregoing connection to the power line 44, a voltage connection for the converter 47.

In the usual manner, the thermal converter 47 utilizes the current and voltage quantities applied to its input terminals to produce a D. C. output voltage, between the conductors shown at the right of the converter, which D. C. output voltage is representative of the power consumed by the heater 42, and hence of the total electrical power input to the process or furnace 40. This D. C. converter output is the so-called total input signal for the process 40. As noted above, the magnitude of the last mentioned D. C. signal is of the same order as the magnitude of the output of the thermocouple 43. This thermocouple output is the so-called process variable signal for the process 40.

The thermal converter 47 may take any one of several known and commercially available forms for such devices, and may, for example, be of the form shown in the Miller Patent No. 2,283,566. Since the manner in which such a converter is constructed and is operative is well known in the art, and is fully described in said Miller patent, and since the detailed construction per se of the thermal converter employed forms no part of the present invention, no further description of the converter 47 is seen to be required herein.

The output of the integrator 25 is shown connected to a null detector 50 which may be used to control the application of power to the heater 42 by way of switch 51.

A controller 53 and adjustable timer 53A are also included in Fig. 2 and this controller may take the form of a conventional controller having an input from the thermocouple 43 and a set point input from a set point device 54. The timer 53A is shown controlling a relay 55 having a coil 56 and a switch 57, the latter of which may be arranged to latch in a closed position once it has been so actuated by the coil 56. The relay 55 will be actuated a preselected time after the null detector 50 has cut off the power to the process. Connected to the output of the controller 53 is a motor 58 which is connected to variably adjust a rheostat 59 or other power control device.

The operation of the analog 10 in Fig. 2 will correspond to the operation of the analog 10 in Fig. 1. Thus, there will be a signal produced on the output of the integrator 25 on terminals 28 and 29 which will be indicative of the total useful input required to change the charge on the capacitor 13 from a starting value to a set point value. This integrated value will be representative of the input required in the furnace 41.

The useful input to the process 40 is determined by combining the process variable signal (output of the thermocouple 43) with the total input signal (output of the thermal converter 47) in such a manner that the useful input to the process is determined. This is accomplished by connecting the thermocouple 43 in series with the output of the thermal converter 47 so that the difference between the thermocouple and thermal converter output signals will be applied to the integrator 25. This will be seen by viewing the process curves shown in Fig. 3. The total input to the process will be represented at any particular time by a point along the line M—N. The process variable will be represented by a corresponding time point along the curve O—N. The difference between the process variable point and the total input will be representative of the useful input to the process. The useful input signal from the process 40 will be applied to the integrator 25 by a circuit that may be traced from ground terminal 52 through the thermocouple 43, thermal converter 47, resistor 23, capacitor 27, and output terminals 28—29 back to the ground 52. As the signal from the process will be in opposition to the signal from the analog 10, the process signal will tend to cause the output of the integrator 25 to go in a direction opposite to that to which it was changed by the predicting process analog 10. Thus, the integrator output will follow the curve R shown in Fig. 3. As soon as a zero potential is reached on the output of the integrator 25 the null indicator 50 will be effective to cut off the input power to the heater 42 by the opening of the switch 51. This will occur along the time line $T_1$ shown in Fig. 3 so that the input to the process will be changed from a maximum input to zero input.

After the input has been cut off, the process will continue to coast until the process variable reaches the desired set point at time $T_2$. The controller 53 will be cut in to control the process at some predetermined time prior to the actual attainment of the set point to insure that the process will not appreciably deviate from the set point. The time it will be cut in is primarily a factor of the process dead time, which factor is set into the adjustable timer 53A. As mentioned above, this timer 53A starts its timing function when the null detector 50 actuates the switch 51. When relay 55 pulls in, a further energizing circuit will be completed to the heater 42 between its tap and one end by way of the rheostat 59, and switch 57 which will latch closed, by means not shown. The controller will then adjust the rheostat 59 by way of motor 58 to maintain the measured variable at the desired set point.

It will be readily apparent that in both Figs. 1 and 2 that the types of analogs used will be dependent upon the type of process used. Further, the time scale factor for one analog may be adjusted to the process by the adjustment of the resistor 23. The time scale factor adjusting resistor may be of particular advantage where the analog used is fast in time compared to the time of the process.

While, in accordance with the provisions of the statutes, there have been illustrated and described the best forms of the invention known, it will be apparent to those skilled in the art that changes may be made in the forms of the apparatus disclosed without departing from the spirit of the invention as set forth in the appended claims, and that, in certain cases, certain features of the invention may be used to advantage without a corresponding use of other features.

Having described the invention, what is claimed as new and for which it is desired to secure Letters Patent is:

1. A process controller comprising a process analog, a signal generator connected to said process analog to supply thereto an input signal representative of a desired magnitude of a variable of said process, process input supply and input measuring means connected to said process, a process variable sensing means connected to said process, and a single integrating means connected to the output of said process analog and to said process variable sensing means and said input supply measuring means for application to said integrating means of the difference between said analog output and the useful input to said process, said integrating means having a predetermined output for regulating said input supply means when the integrated value of the useful input to said process corresponds to the integrated value of said analog output.

2. Electrical apparatus comprising a process analog including resistance and capacity means, a first signal source connected to the input of said analog, an integrating means connected to the output of said analog to integrate with respect to time the input signal from said first signal source supplied to said capacity means, a second signal source representative of the useful input to a controlled process represented by said analog, which input is used in changing a variable of said process from one magnitude to a second magnitude represented by said analog input signal from said first signal source, means connecting said second signal source to said integrating means to cause the latter to integrate with respect to time the signal applied to said integrating means from said second signal source, and a process controller connected to the output of said integrating means and operative to control the application of said input to said process in accordance with said integrated signals.

3. Electrical apparatus comprising a process analog including resistance and capacity means, a first signal source connected to the input of said analog, an integrating means connected to the output of said analog to integrate with respect to time the input signal from said first signal source supplied to said capacity means, a second signal source having an output signal which is representative of the difference between the total input to a process represented by said analog and the magnitude of a measured variable of said process, said analog input signal being representative of a predetermined magnitude of said variable, means connecting said second signal source to said integrating means to cause the latter to integrate with respect to time said output signal of said second signal source, and a process controller connected to the output of said integrating means and operative to control the application of said input to said process in accordance with said integrated signals.

4. Electrical apparatus comprising a process analog including resistance and capacity means, a first signal source connected to the input of said analog, an integrating means connected to the output of said analog to integrate with respect to time the input signal from said first signal source supplied to said capacity means, a second signal source having an output signal which is representative of the difference between the total input to a process represented by said analog and the magnitude of a measured variable of said process, said analog input signal being representative of a predetermined magnitude of said variable, means connecting said second output signal of said signal source to said integrating means in opposition to said output of said analog to cause said integrating means to provide an output signal which is the difference between the integrated value of said analog input signal and the integrated value of said output signal of said second signal source, and a null signal detector connected to the output of said integrating means and operative to detect the occurrence of the minimum value of said output signal of said integrating means representative of substantial equality between said integrated values.

5. A predicting controller for a furnace having an electrical power input, comprising an analog of said furnace, a signal generator connected to the input of said analog, a signal integrating means, means including said analog connecting said signal generator to said integrating means, said integrating means producing an output signal indicative of the power input required in said analog to change the analog output signal applied to said integrating means from one magnitude to another, a furnace input power measuring means, a furnace temperature measuring means, means connecting said input power measuring means and said temperature measuring means to said integrating means for application thereto of the difference between a signal representative of said furnace input power and a signal representative of said furnace temperature, said difference signal being applied to said integrating means in opposition to said analog output signal to modify said output signal of said integrating means in accordance with the useful input applied to said furnace, and a furnace controller connected to the output of said integrating means and operative to control said furnace input power in accordance with the difference between the integrated value of said analog output signal and the integrated value of said difference signal.

6. A predicting controller for a process having an electrical power input, comprising an analog of said process, a signal generator connected to the input of said analog, a signal integrating means, means including said analog connecting said signal generator to said integrating means, said integrating means producing an output signal indicative of the power input required in said analog to change the analog output signal applied to said integrating means from one magnitude to another, a process input power measuring means, a process temperature measuring means, means connecting said input power measuring means and said temperature measuring means to said integrating means for application thereto of the difference between a signal representative of said process input power and a signal representative of said process temperature, said difference signal being applied to said integrating means in opposition to said analog output signal to modify said output signal of said integrating means in accordance with the useful input applied to said process, a null detector connected to the output of said integrating means and operative to detect the occurrence of the minimum value of said output signal of said integrating means occurring when the integrated value of said difference signal becomes substantially equal to the integrated value of said analog output signal, and a process input controller connected to be controlled by said null indicator to adjust the process input power upon the detection by said null detector of said minimum value of said output of said integrating means.

7. Apparatus as defined in claim 6, wherein said analog has a time scale faster than the time scale of said process.

8. Electrical apparatus comprising a process analog including resistance and capacity means, a first signal source connected to the input of said analog, an integrating means connected to the output of said analog to integrate with respect to time the input signal from said first signal source supplied to said capacity means, a second signal source representative of the useful input to the process represented by said analog, which input is used to change a variable of said process from one magnitude to a second magnitude represented by said analog input signal from said first signal source, time scale factor means connecting said second signal source to said integrating means to cause the latter to integrate with respect to time the signal applied to said integrating means from said second signal source, and a process controller connected to the output of said integrating means and operative to control the application of said input to said process in accordance with said integrated signals.

9. Apparatus as defined in claim 8, wherein said time scale factor means comprises an adjustable impedance.

10. A process controller comprising a predicting analog of the process, integrating means connected to said analog to produce a first integrated output signal indicative of the useful input supplied to said analog in changing the output of said analog to a desired magnitude thereof, process condition and input sensing means connected to said integrating means to produce a second integrated output signal of a sense opposite to said first output signal and indicative of the useful input supplied to said process in changing said condition to a desired magnitude thereof related to the first mentioned magnitude, and a process regulating means connected to the output of said integrating means and operative to control the input to said process in accordance with said opposing first and second output signals.

11. Apparatus for predicting the start-up of a process comprising a fast acting analog of a process to be controlled, a signal generator connected to the input of said analog to supply thereto a signal representative of a desired magnitude of a measured variable of said process, an integrating means having an input connected to the output of said analog for application of the output signal of said analog to said integrating means, the latter producing an output signal in response to said analog output signal which is indicative of the useful input applied to said analog in changing said analog output signal from a first magnitude to a second magnitude related to said desired magnitude, means connected to said input of said integrating means to simultaneously apply thereto, along with said analog output signal, a signal representative of the useful input being applied to said process to change said measured process variable to said desired magnitude, the last mentioned signal being operative to modify said output signal of said integrating means in accordance with said useful input being applied to said process, and control means connected to the output of said integrating means to regulate the application of the input to said process in response to said output signal of said integrating means.

References Cited in the file of this patent
UNITED STATES PATENTS 2,153,001   Rabe _____ Apr. 4, 1939

OTHER REFERENCES

Jones: "Computer Techniques in the Instrumentation Industries," Journal of the Instrument Society of America, February 1954, pages 13–16.